United States Patent [19]

Tsukagoshi et al.

[11] 3,947,256

[45] Mar. 30, 1976

[54] METHOD FOR DECOMPOSITION OF POLYMERS INTO FUELS

[75] Inventors: Yoichi Tsukagoshi, Tokyo; Kyohei Tsuchiya, Ageo; Toshio Inoue, Yachiyo; Toshihiko Ogawa, Matsudo; Hideo Komori, Yokohama; Kyoichi Murakami, Tokyo; Taizo Ayukawa, Mobara, all of Japan

[73] Assignee: Kabushiki Kaisha Niigata Tekrosho, Japan

[22] Filed: May 1, 1972

[21] Appl. No.: 249,093

[30] Foreign Application Priority Data

| May 10, 1971 | Japan | 46-30933 |
| May 10, 1971 | Japan | 46-30934 |
| May 26, 1971 | Japan | 46-36103 |
| Aug. 18, 1971 | Japan | 46-63138 |
| Aug. 18, 1971 | Japan | 46-63140 |

[52] U.S. Cl. ............................................. 44/50; 44/2
[51] Int. Cl.$^2$ ...................... C10L 1/00; C10L 1/04
[58] Field of Search ....................... 44/1 R, 2, 80, 50

[56] References Cited
UNITED STATES PATENTS

| 1,674,129 | 6/1928 | Rulon | 44/2 |
| 1,832,827 | 11/1931 | Youngblood | 44/2 |
| 2,461,004 | 2/1949 | Soday | 260/683 X |
| 3,615,284 | 10/1971 | Cassar | 44/1 R |

OTHER PUBLICATIONS

Chemistry of High Polymer Degradation Processes, by Grassie, 1956, p. 110.

*Primary Examiner*—Carl F. Dees
*Attorney, Agent, or Firm*—Steinberg & Blake

[57] ABSTRACT

A method for treating high polymer wastes in such a way that pollution of the atmosphere will be avoided. Solid high polymer bodies are subjected to simultaneous compression and shearing action until they reach a state of fusion and decompose at least in part into a fluid state. The fluid is then directed to a location where it is available as a fuel. A rotary feed screw is situated in a cylinder to coact therewith for providing compression and shearing of high polymer bodies until they reach a state of fusion. Then the fused material is subjected to a decomposing action in order to decompose into a fluid condition, and the resulting fluid is conveyed to a location where the fluid is available for further use.

5 Claims, 7 Drawing Figures

METHOD FOR DECOMPOSITION OF POLYMERS INTO FUELS

BACKGROUND OF THE INVENTION

The present invention relates to methods for treating petrochemical high polymer wastes in such a way that pollution of the atmosphere will be avoided.

With the high degree of industrial development which has taken place in many parts of the world, there is a high concentration of industrial operations in many locations. The result is that complete freedom to carry out various industrial operations has a damaging effect on the ecology. Thus, it is not unusual to encounter situations where entire cities as well as the areas surrounding the cities suffer from smoke, impure water, offensive odors, fine particles of dust, gases, wastes, and the like, all of which have an undesirable effect not only on human beings and animals but also upon crops, aqueous products, and the like. Among these problems, some of the most serious difficulties are encountered in connection with air pollution by smoke or the like, water pollution by industrial wastes, and the accumulation of wastes and particulate matter which cannot be readily disposed of by combustion.

It is in particular in connection with disposal of high polymer wastes that special problems are encountered.

SUMMARY OF THE INVENTION

Thus, it is a particular object of the present invention to provide a method capable of treating high polymer wastes in such a way that valuable energy and useful products can be derived therefrom without any deleterious effect on the ecology.

Thus, it is a particular object of the present invention to treat waste products, inferior products, or insufficiently polymerized products made of high polymers, especially petrochemical high polymers, in such a way that they can be decomposed into gaseous or liquid fuels which can be stored until use thereof is desired or which can be immediately burned as soon as such products are collected.

With respect to the treatment of high polymer waste bodies, such as scraps, particularly petrochemical high polymer scraps, it has been proposed to burn such scraps or to fuse them into reclaimed products. However, in accordance with a further object of the present invention it is proposed instead to dissociate such polymers back into their original petroleum components, wherever possible.

In order to accomplish this object the scraps could be subjected to a dry distillation process in a vacuum or inactive gas environment for gasifying the scraps and then the generated gases could be collected. However, carrying out a method of this nature will involve great difficulties because of technical and economic factors.

It is therefore yet another object of the present invention to provide a method capable of converting high polymer scraps, particularly petrochemical high polymer scraps, into fuels with an exceedingly high efficiency, with the possibility of burning the resulting fuels, if desired.

While it is known that waste plastic materials may be treated by being burned in solid condition, such a method involves extremely high temperatures which can at times result in destruction of the combustion apparatus and which also may result in the generation of smoke or other poisonous gases such as carbon monoxide.

It is therefore a further object of the present invention to provide a method for heating, fusing and decomposing high polymer scraps so as to generate gaseous and/or liquid fuels therefrom, and then the burning of such fuel may be used as a source of heat or power.

Thus, it is a general object of the present invention to provide an extremely efficient, low-cost method for treating high polymer wastes in such a way that their value is not lost while at the same time there is an absolute prevention of any pollution of the atmosphere.

According to the method of the invention solid high polymer bodies are fed along a predetermined path while being simultaneously compressed and sheared until they reach a state of fusion and decompose at least in part into a fluid state. The thus-achieved fluid is then directed to a location where it is available as a fuel.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
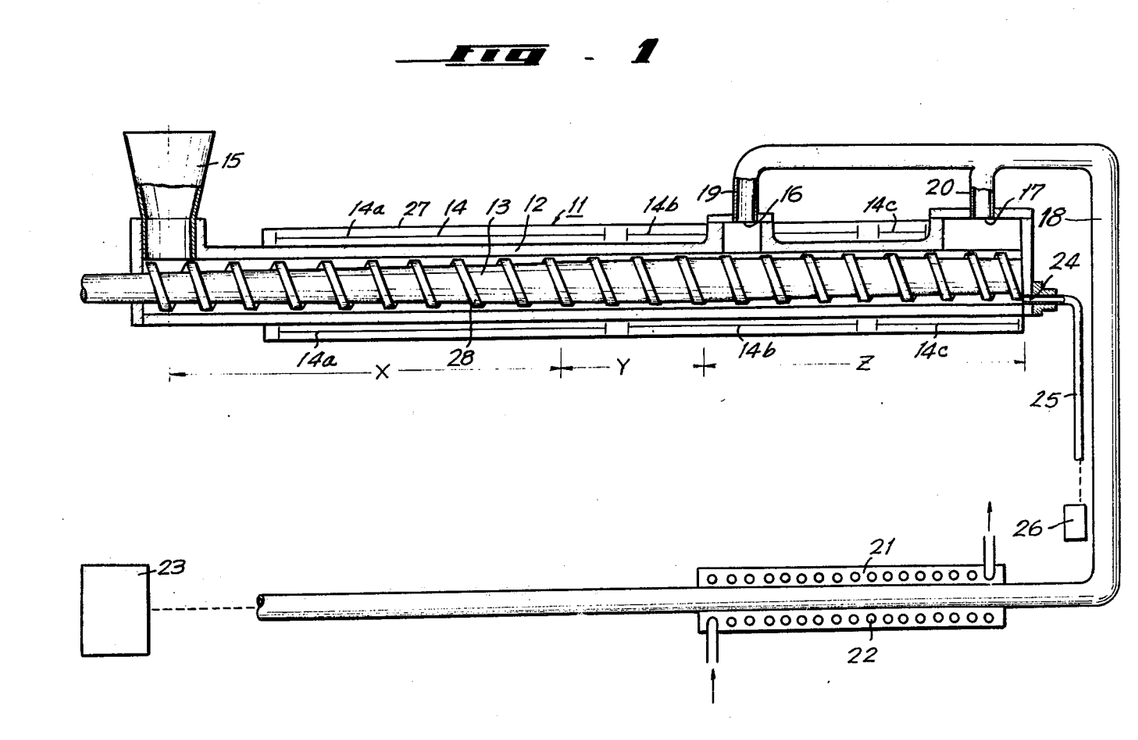
FIG. 1 is partly schematic sectional elevation of one possible embodiment of an apparatus for practicing the method of the invention in order to convert high polymers into fuels.

Referring first to FIG. 1, there is shown therein a combined compression and shearing means 11 made up primarily of a feed screw and cylinder which has a construction similar to that of an extruder. Thus, the combined compression and shearing means 11 includes an elongated hollow cylinder 12 in which is situated a rotary feed screw 13. A heating means is provided for heating the materials acted upon by the combined compression and shearing means 11. This heating means 14 takes the form of suitable jackets surrounding the cylinder 12 and having hollow interior spaces which may receive a heating medium such as steam, for example.

The left inlet end of the cylinder 12, as viewed in FIG. 1, is provided with a supply hopper 15 adapted to receive the solid high polymer waste bodies in the form of scraps, inferior products, or insufficiently polymerized products composed of high polymers.

A fluid-conveying means is provided for conveying fluids away from the cylinder 12. This fluid-conveying means includes the conduit portions 19 and 20 shown at the upper right of FIG. 1 communicating with the openings 16 and 17, respectively, in the cylinder 12. Through these openings 16 and 17 gases generated in the cylinder will be vented into the conduits 19 and 20. The conduits 19 and 20 communicate with a common conduit 18 to which all of the collected gas is delivered. Thus, different components of the high polymer scrap bodies may have different decomposition temperatures. By providing the pair of openings 16 and 17 at axially spaced parts of the cylinder 12, gases which are generated at lower temperatures will vent through one of the openings while gases which are generated at higher temperatures will vent through the other opening. Through this expedient it is possible to increase the yield of gases and prevent possible explosion due to extremely high temperatures. In addition, gases which vent through the first conduit portion 19 and which have a lower boiling point mix with the gases of higher boiling point issuing into the conduit portion 20 so that it is a mixture of these gases in the common collecting pipe 18 which form a substantially homogeneous mixture of gases, thus enabling the gases to be treated conveniently during subsequent stages.

A cooling means 21 surrounds a portion of the gas-collecting conduit means 18 which form part of the fluid-conveying means. This cooling means 21 includes a coil 22 wound around the conduit 18 and providing a passage for a cooling fluid such as water or air. Thus, particularly at the region of the cooling means 21 the gases issuing from the cylinder 12 will be cooled and will separate into gaseous and liquid phases. The fluid-conveying means 18 delivers the fluid to a fuel-collecting tank 23 in which the gases and/or liquids from the cooling means 21 are stored.

As will be apparent from the description which follows, the feed screw 13 coacts with the cylinder 12 to form therewith a combined compression and shearing means in which the high polymer bodies are compressed and sheared until they assume a fused condition, with the right end portion of the cylinder 12 and screw 13 forming a decomposing means in which the fused material decomposes into the fluid condition. At the outlet end of the cylinder 12, situated at its right, as viewed in FIG. 1, the cylinder 12 has an end wall which closes the cylinder 12 and which is formed with a discharge port 24 through which residual liquids flow into a pipe 25. The liquids which thus collect in the pipe 25 are directed thereby to a means 26 such as a suitable container in which the residual liquids solidify to form reclaimed products such as wax, paraffin, etc.

The heating means 14 which surrounds the cylinder 12 includes the jacket 27 which extends coaxially along the exterior of the cylinder 12 and which has a series of heating stages in which heating may be carried out by suitable electric heaters or steam heaters. The first-stage heating means 14a is designed so as to provide a heating temperature of 160°–400°C. The first stage 14a is followed by a second stage 14b where the heating means provides a temperature of 400°–600°C. Finally, the third stage 14c of the heating means will provide a temperature range of 600°–800°C. These several heating stages are in the form of separate units which are separately adjustable to provide the required heating temperatures. As a result of arranging the heating means 14 in the form of heating stages in this manner, there are three physical-chemical zones $x$, $y$, and $z$ established axially along the cylinder 12. The zone $x$ forms a heating, compressing, and shearing zone, the zone $y$ forms a heating, fusing and decomposing zone, and the zone $z$ forms a superheating or overheating and decomposing zone.

The feed screw 13 is formed by an elongated screw body 28 which is tapered in such a way that its diameter gradually increases in the direction of flow of the compressed and sheared material, which is to say to the right, as viewed in FIG. 1, this diameter gradually increasing from zone $x$ to zone $y$. As a result, while the scraps are fed along this part of the combined compression and shearing means 11, they will be compressed and sheared between the rotary screw shaft 13 and the inner surface of the cylinder 12 while progressing toward the zone $y$. This action will generate heat as a result of the internal friction, so that in this way the amount of heat which must be supplied externally can be reduced.

While the diameter of the shaft 13 gradually increases in the direction of movement of the compressed and sheared material in the zones $x$ and $y$, at the zone $z$, which forms the decomposing zone constructed simply as a continuation of the cylinder 12 and the screw 13, the diameter of the screw tapers in such a way that this diameter becomes progressively smaller toward the port 24. As a result of this gradually smaller diameter of the rotary screw shaft in the direction of flow of the material toward the discharge end of the cylinder 12, there is a decompression of the material due to the decreased pressure from the screw shaft 13, and this will accelerate decomposition of undecomposed materials in the zone $z$ which forms the decomposing means of the embodiment of FIG. 1.

Thus, with the embodiment of FIG. 1 the operations are started by initiating the rotation of the screw shaft 13 in the required direction from a suitable driving source which is not illustrated. The solid bodies of high polymer scrap which are to be treated are fed into the cylinder 12 through the supply hopper 15. These solid bodies will be compressed, sheared and partially fused in the heating, compressing, shearing and fusing zone $x$ as a result of the action of the rotating screw 28. Then the material is transferred into the heating, fusing and decomposing zone $y$ where complete fusion takes place and where the material assumes a fluid state and partially decomposed. From this zone $y$ the fluid is fed into the overheating and decomposing zone $z$. Those gases which have a relatively low boiling point will be generated from decomposition of the high polymers at an early stage near the starting end of the zone $z$ and will flow into the fluid-conveying means 18 through the opening 16 and the first branch 19. On the other hand, those gases which have a higher boiling point will be generated as a result of decomposition at the end of the zone $z$, and the resulting gases will flow through the opening 17 and then the branch 20 into the fluid-conveying means 18 so that the higher and lower boiling point gases will mix together in the fluid-conveying means 18. The gases which are collected in this way flow through that portion of the conduit 18 which is surrounded by the cooling means 21, so that the gases are cooled to room temperature in order to form gaseous fuel or condensed liquid fuel which is stored in the fuel-collecting tank 23 which thus forms a location where the fluids are available as a fuel.

Those residual liquids which remain undecomposed in the cylinder 12 will discharge through the port 24 into the collecting pipe 25 to be received in the means 26 where the residual liquids will solidify. This solidification of the residual liquids may take place with the aid of suitable means which forms reclaimed products such as wax, paraffin, etc.

With the above-described embodiment of the invention scrap bodies of petrochemical high polymers, such as polyethylene, polypropylene, polystyrene, etc. are continuously transformed from a solid state into a liquid state (and from the latter into a gaseous state, if desired) in the combined compression and shearing means 11 as well as in the discharge end portion thereof which forms the decomposing means, these actions taking place in such a way that a maximum effect is achieved with minimum thermal energy. In other words the means 11 operates in such a way that there is a minimum heat loss because it is sealed in a gas-tight manner and in addition the interior of the cylinder 12 is tightly filled with the high polymer bodies which are treated so that there is absolutely no space within the cylinder 12 through which gas can possibly escape back to the hopper 15. In addition since during solid-to-liquid transformation the bodies are compressed and sheared mechanically resulting in the generation of internal heat, the amount of heat which must be supplied externally is reduced. Since it is possible to control the rate at which the high polymer bodies are supplied to the means 11, it is possible to adjust the generation of gases to maintain the latter generation at a constant value by controlling the rate of supply of high polymer scrap bodies to the means 11. As a result it is possible to collect the generated gases in a simple and continuous manner in a simple way and with simple structure which is easy to maintain.

Figure 2:
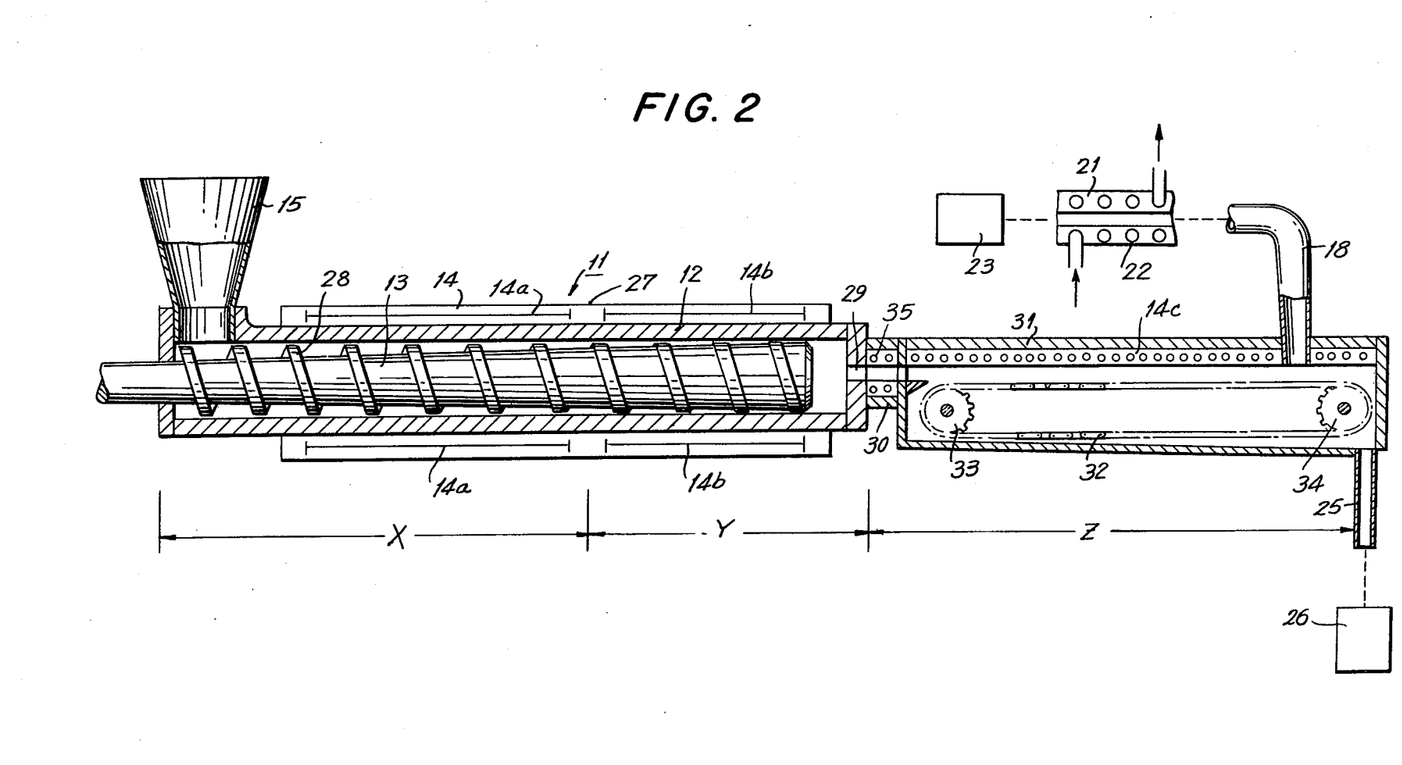
FIG. 2 is a schematic longitudinal sectional elevation of another embodiment of a method according to the invention.

Referring now to FIG. 2, the embodiment of the invention which is illustrated therein differs with respect to the decomposing means at the zone $z$. Thus, with the embodiment of FIG. 2 the cylinder 12 does not have a continuation in which a continuation of the screw 13 is located to form the decomposing means. Instead the cylinder 12 is closed at its right end by a wall formed with a discharge port 29 to which there is attached a nozzle 30 forming what amounts to an extruder die having a selected configuration suitable for the configuration of the outlet port 29. The decomposing means of this embodiment includes an elongated decomposition furnace 31 made of a heat-resistant material and communicating with the discharge nozzle 30. With the embodiment of FIG. 2, the combined compression and shearing means 11 acts on the scrap bodies of plastic or the like to convert them from the solid state into the fused condition. The function of decomposing the fused material is carried out in the decomposing means 31 at a higher efficiency than with the embodiment of FIG. 1.

Within the decomposing furnace 31 there is a longitudinally arranged heat-resistant endless slit-type of conveyor 32 surrounding and meshing with gears 33 and 34 used to drive the conveyor, so that this construction forms the equivalent of a moving grate. The conveyor 32 is positioned in such a way that its upper run is at the same elevation and in the same horizontal plane as the discharge port 29. This embodiment includes a heating means 35 which is located at the nozzle 30 and extends along the furnace 31 to form the third heating stage 14c. In order to promote decomposition of the fused material, the nozzle or die 30 is sealed in a gas-tight manner so as to maintain a vacuum or inert gas atmosphere within the overheating and decomposing zone $z$. The temperature which prevails at the third stage 14c of the heating means is easily adjusted so as to be within a range of 600°–1000°C. The fluid-conveying means 18 is in the form of a conduit which communicates with the interior of the decomposing means 31 to collect gases which flow therefrom, and any residual liquids discharge out of the furnace through the pipe 25 shown at the lower right end of the furnace 31 in FIG. 2. The feed screw 13 is tapered so that its diameter gradually increases in the direction of movement of the material from the heating, compressing and shearing zone $x$ to the heating and fusing zone $y$.

With this embodiment of the invention after the rotation of the feed screw 13 has started, the solid bodies are fed into the means 11 from the hopper 15 to progress along the interior of the cylinder 12. This material is heated, compressed and sheared while traveling through the zone x toward the heating and fusing zone $y$, and then the material in a fused state is forced out through the discharge port 29 and the die 30 into the overheating and decomposing zone $z$ formed by the decomposing means 31. The partially treated and fused material introduced in this way into the furnace 31 is conveyed by the heat-resistant conveyor 32 through and along the decomposing furnace 31 so as to decompose into gaseous form. The gases generated in this way flow out through the pipe 18 which is acted upon the cooling means 21 in a manner described above, so that the gases are cooled to room temperature in order to form a gaseous fuel and/or condensed liquid fuel which is stored in the fuel-collecting tank 23. On the other hand, those residual liquids which do not become decomposed flow out through the pipe 25 and are solidified into reclaimed products such as wax, paraffin, etc. by way of the residual liquid solidifying means 26.

Thus, with the embodiment of FIG. 2, the combined compression and shearing means 11 and the decomposing means 31 are constructed as separate units coupled together by way of the nozzle or die 30 which has a predetermined configuration. It is therefore possible not only to decompose high polymers having relatively high boiling points which are difficult to decompose only by way of the means 11, but in addition it is possible to avoid the danger that components of the means 11 such as the cylinder 12 and screw 13 suffer from corrosion due to the action of the gases which are generated. This feature is of particular advantage in the case where the high polymer scraps or bodies and the gases which are to be treated have strongly corrosive or errosive properties. Inasmuch as the interior of the decomposing furnace 31 is isolated from the outer atmosphere, it is possible to generate the gases very efficiently and also to liquify these gases in a vacuum or inert gas atmosphere such as nitrogen, algon, etc. In addition, the scraps can be continuously supplied so that it is possible to generate a constant volume of gas which is subsequently collected in a simple and continuous manner.

Figure 3:
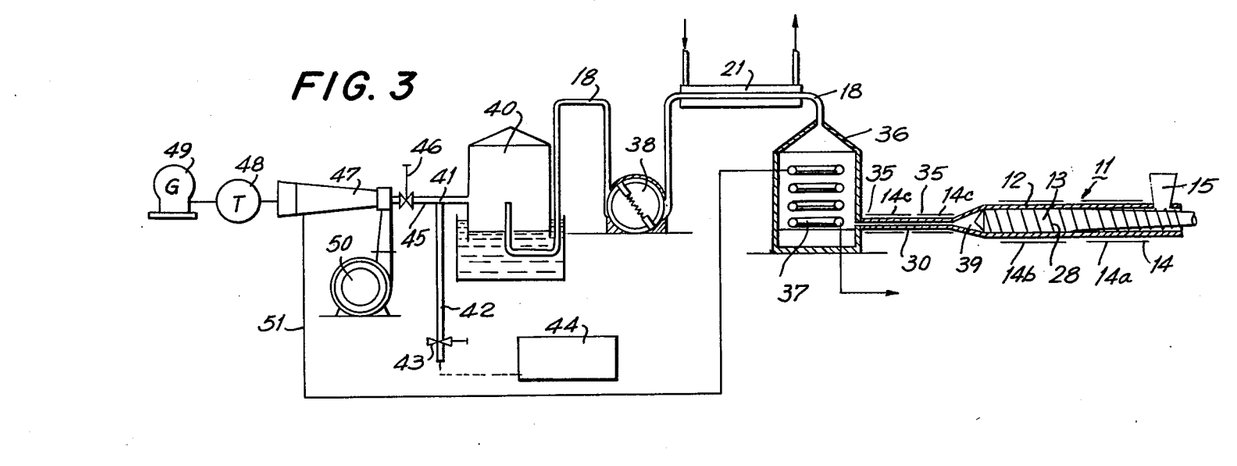
FIG. 3 is a schematic illustration of a further embodiment of a method of the invention.

Referring now to FIG. 3, the combined compression and shearing means 11 of this embodiment is substantially identical with that of FIG. 2, the main difference being that the discharge end of the cylinder 12 has a tapered end 39 communicating with an elongated tubular element 30 which operates in a manner similar to the nozzle or die 30 of FIG. 2. The elongated hollow nozzle 30 of FIG. 3 communicates with the interior of an evacuated enclosure 36 in the form of a heat-retaining tank having a reduced interior pressure. In the interior of the evacuated enclosure 36 is located a heating means formed by a pipe 37 which forms an internal heat exchanger within the enclosure 36. The internal pressure of the tank or enclosure 36 is conveniently maintained at a low pressure by way of a pump means 38 in the form of a rotary pump which by maintaining the low pressure in the enclosure 36 serves to promote decomposition. The decomposed fluids are sucked out of the evacuated enclosure 36 through the fluid-conveying means 18 which is cooled by the cooling means 21 as described above, and these fluids are then delivered by the pump means 38 to the portion of the fluid-conveying means 18 which extends from the outlet of the pump 38 to the collecting means 40. This means 40 takes the form of a constant pressure sink and float tank in which the gaseous and liquid states of the fluids are separated from each other so that the generated gaseous fuel and liquid fuel are adapted to be stored at the collecting means 40. This collecting means 40 communicates with a T-shaped pipe 41 which directs part of the gaseous fuel through a pipe 42 and a control valve 43 into a suitable combustion device 44 to be burned therein. The other portion of the stored gaseous fuel flows through the branch 45 and a control valve 46 into a gas burner 47 which is coupled with a gas or steam turbine 48 which in turn drives a power generator 49. A blower 50 is operatively connected with the gas burner 47 while part of the heat generated thereby is directed in the form of a hot gas into the pipe 51 which delivers the hot gas to the heat-exchanger coil 37 within the evacuated enclosure 36. Thus, part of the hot gases at the burner 47 are fed back to the interior of the enclosure 36 for heating the interior of the evacuated chamber 36 which forms part of the decomposing means of the embodiment of FIG. 3.

Therefore, with the embodiment of FIG. 3 the high polymer scrap bodies introduced through the supply hopper 15 are fed to the left, as viewed in FIG. 3, along the interior of the combined compression and shearing means 11 by way of rotation of the feed screw 13, and while moving in the interior of the means 11 the high polymer bodies are subjected to shearing and compression action as a result of the rotation of the screw 13 the diameter of which gradually increases from the inlet toward the outlet end of the cylinder 12, so that some frictional heat is generated in this way. Additional heat is derived from the external heating means 14, provided into the three stages 14a, 14b and 14c, as described above. In this way the high polymer bodies which are subjected initially to compression and shearing are transformed into a fused state and then assume the form of a highly viscous liquid which flows out through the tapered outlet 39 of the cylinder 12. This highly viscous liquid is converted into a Newton fluid of low viscosity while traveling along the interior of the discharge nozzle 30 whose interior space is evacuated in the same way as the interior of the enclosure 36. This liquid pours into the heat-retaining reduced-pressure enclosure 36 which is maintained at an elevated temperature higher than the temperature in the discharge nozzle 30 which is heated by the heating means 35. This heating means 35 is formed by the jacket portions 14c as described above. Thus, the high polymers in fused condition flow into the heat-retaining reduced-pressure enclosure 36 to be decomposed at a reduced temperature. More specifically, the high molecular hydrocarbons are depolymerized into some lower molecular hydrocarbons. During the initial stage of the operation, the interior of the evacuated enclosure 36 is maintained at a vacuum as a result of the action of the pump means 38 so that the possibility of explosion and burning of the gases which are at a high temperature is prevented. The gases which are generated in this way flow through the fluid-conveying pipe 18, along the portion thereof surrounded by the cooling means 21, so as to be cooled to room temperature and separated into the gaseous and liquid phases for storage in the constant-pressure sink and float tank 40 after traveling through the rotary pump means 38. Inasmuch as the liquids which are received in the collecting means 40 will float on water, they are easily collected by use of a siphon means (not shown) or the like, so that the liquid collected in this way can be subsequently used as a liquid fuel.

On the other hand, the gaseous phase which is stored in the tank 40 is partially discharged through the outlet pipe 41 and the branch 42 in order to reach the control valve 43. From the latter the combustible gas is introduced into the combustion apparatus 44 which is located conveniently to have the gases burned therein, with any desired use being made of the heat which is extracted from the gas in this way. The remainder of the gases from the tank 40 are directed through the valve 46 to the gas burner 47 which is directly coupled to the gas or steam turbine which drives the power generator 49, so that in this way the energy of the gas will be used to generate electrical power which can be used for operating various devices as well as for illumination purposes, or this energy may be used to operate any desired instruments or apparatus situated outside of the illustrated system. Thus, with the system according to the embodiment of FIG. 3 any petrochemical high polymers can be treated. In particular, waste plastics forming part of community wastes, industrial wastes, etc. can be treated in a convenient way to form useful reclaimed products for subsequent use.

In accordance with the invention the petrochemical high polymers are burned after they have been decomposed into gases by heating them at a reduced pressure. More specifically, during burning of the gases they are uniformly mixed with a sufficient volume of air. As a result there is no danger that poisonous gases such as carbon monoxide etc. can be generated as a result of imperfect combustion, as is the case when solid matter is directly burned. In addition, since the materials to be burned is in a gaseous form immediately before combustion, it is possible to provide a highly effective convenient control for combustion. According to the embodiment of FIG. 3, the high polymers are decomposed into gases not only by being subjected to heating and fusing, but also by reducing the operating pressure. In this way the decomposition of the high polymers is promoted to a great extent and there is an increase in the efficiency of the decomposition with a minimum amount of undecomposed residues remaining.

Figure 4:
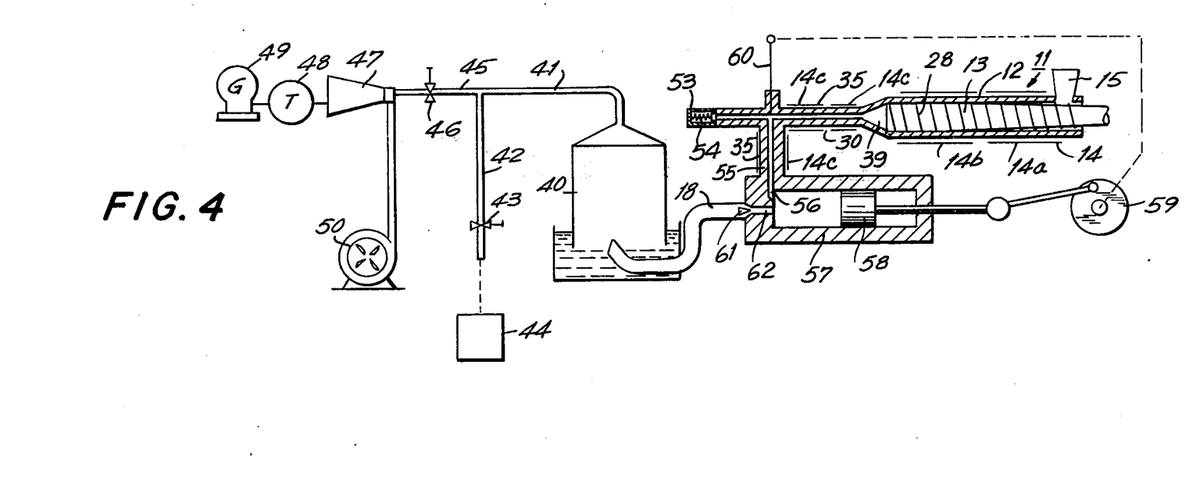
FIG. 4 is a partly sectional schematic elevation of a fourth embodiment of a method according to the invention.
Figure 5:
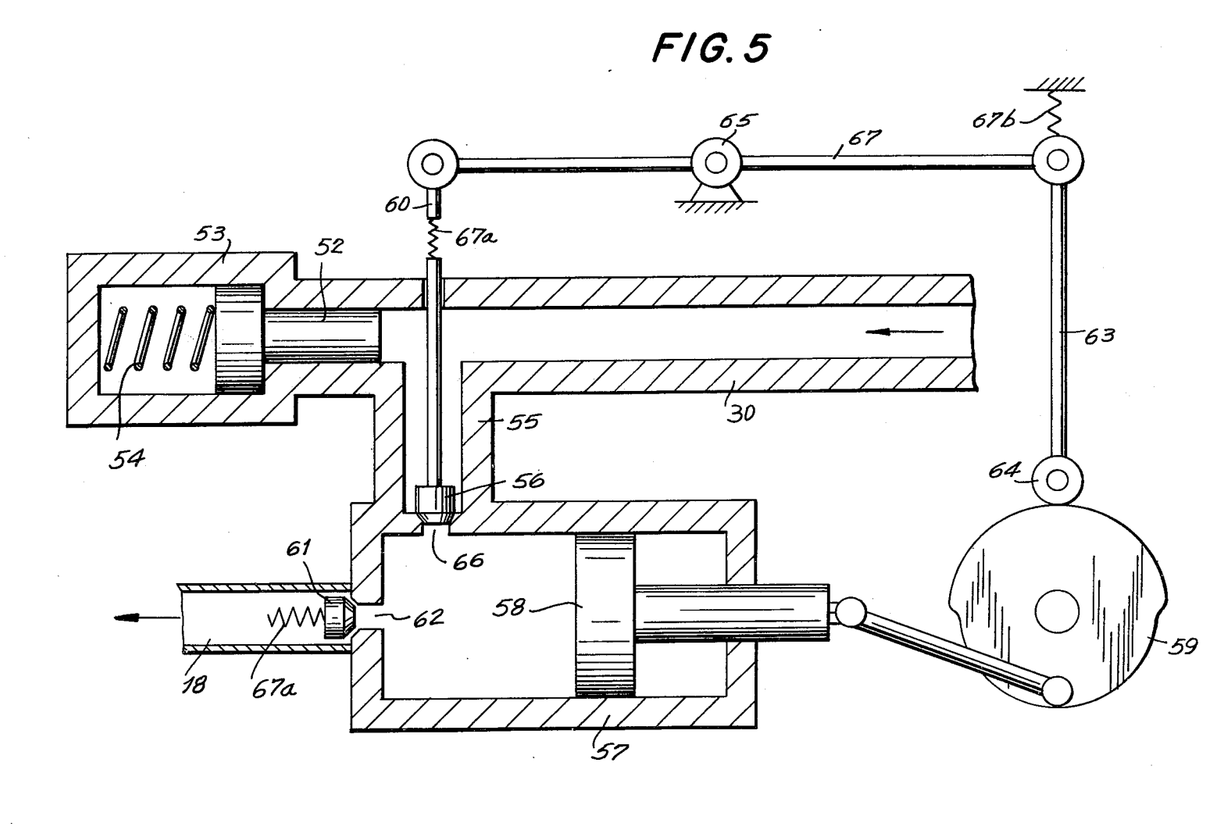
FIG. 5 is a partly schematic sectional elevation, taken on an enlarged scale as compared to FIG. 4, and illustrating in greater detail part of the structure of FIG. 4.

Referring now to the embodiment of the invention which is illustrated in FIGS. 4 and 5, it will be seen that the evacuated enclosure formed by the elongated nozzle 30 is provided at its left end region, as viewed in FIGS. 4 and 5, with a slidable closure rod 52 resiliently urged to the right, as viewed in FIGS. 4 and 5, by a spring 54 housed within an extension 53 of the elongated enclosure or nozzle 30. In this case the evacuated enclosure formed by the nozzle 30 has a perpendicular extension 55 communicating with and projecting therefrom and forming an elongated conduit or extension of the evacuated space in which a needle valve 56 is accommodated. The evacuated interior of the tubular enclosure assembly 30, 55 is placed at a reduced pressure by way of a pump means which in this embodiment is formed by a cylinder 57 and a piston 58 which reciprocates therein. Thus it will be seen that the conduit 55 communicates directly with the interior of the cylinder 57 of the illustrated pump means. The cylinder 57 has a piston rod extending fluid-tightly through the right wall of the cylinder 57, as viewed in FIG. 5, and the outer end of this piston rod is pivotally connected with a link or connecting rod which in turn is pivotally connected with a cam 59 which is roated from any suitable source of power so that this cam 59 also serves as a crank for reciprocating the piston 58. The cam 59 controls through the linkage shown in detail in FIG. 5 an elongated rod 60 which is connected to the needle valve 56. This needle valve is arranged so that it is closed when the piston 58 moves to the left, as viewed in FIG. 5, along its compression stroke while the valve 56 automatically opens when the piston 58 moves to the right, as viewed in FIG. 5, along its suction stroke. A second valve means, in addition to the valve means 56, takes the form of a non-return valve 61 situated at the outlet 62 of the cylinder 57. The parts are shown in FIG. 5 during a compression stroke of the piston 58. At this time the fluid in the cylinder 57 to the left of the piston 58 is pushed out of the latter through the outlet 62 with the non-return valve 61 automatically opening at this time in opposition to the force of the spring 67a which urges the non-return valve 61 to its closed position, so that during the pressure stroke of the piston 58 the decomposed gas or liquid is delivered to the fluid-conveying means 18. The peripheral camming portion of the cam 59 is engaged by a follower roller 64 rotatably mounted at the bottom end of a rod 63 which is urged toward the cam 59 by a spring 67b, so that the upper part of the cam, as viewed in FIG. 5, which has the larger radius, serves at this time to raise the rod 63, compressing the spring 67b, and acting through the lever 67, which is pivotally supported by the fulcrum 65, to urge the rod 60 downwardly and thus hold the needle valve 66 in its closed position. In this way the port 66 is closed automatically during the pressure stroke of the piston 58. The automatically opened valve 61 will at this time permit the gases generated from the decomposition process to flow into the fluid-conveying means 18 which delivers the fluid to the constant pressure sink and float tank 40 in the manner illustrated in FIG. 4.

After the pressure stroke of the piston 58 has been completed, the piston 58 returns along its suction stroke, and now the part of the cam 59 which has the smaller radius will be engaged by the roller 64 so that the spring 67b expands to raise the valve 56 from its seat as a result of the clockwise turning of the lever 67, as viewed in FIG. 5. When the needle valve 56 opens, the non-return valve 61 is automatically returned to its closed position by the spring 67a, and now the negative pressure in the cylinder 57 serves to maintain the outlet 66 closed. Thus, the piston 58 of the pump means will serve to draw the fused plastics from the means 11 in order to introduce the fused plastics into the evacuated atmosphere of the enclosure formed by the tubular components 30 and 55, so that in the evacuated atmosphere of this enclosure decomposition takes place and the fused material assumes a gaseous form. The rod 60 is split into a pair of components separated by a spring 67c which is compressed between the portions of the rod 60 so as to maintain a constant closing force acting on the valve 56. By utilizing a high pressure burner to serve as the gas burner 47, it is possible to eliminate the requirement of a blower.

During operation with the embodiment of FIGS. 4 and 5, the high polymer bodies which are to be treated are introduced into the supply hopper 15 shown at the upper right of FIG. 4. The high polymer scraps are fed to the left, as viewed in FIG. 4, by the rotary screw 13 along the interior of the cylinder 12 of the combined compression and shearing means 11. Therefore, while traveling within the means 11 the high polymers are subjected to shearing and compression action by the cooperation between the rotary screw 13 and the cylinder 12, the diameter of the rotary screw 13 increasing toward the left, as viewed in FIG. 4, in the direction of travel of the material which is worked on. The high polymers are additionally heated by the heating means formed by the stages 14a and 14b of the heating means 14, and in this way the high polymers are brought into the fused state. It will be noted that the heating means 14 has in FIG. 4 the third stage 14c extending along and heating the elongated portions 30 and 55 of the enclosure which is evacuated by the pump means shown at the lower part of FIGS. 4 and 5. When the high polymers reach the tapered discharge portion 39 of the cylinder 12, they are in the form of a viscous liquid and flow along the interior of the evacuated enclosure 30, 55. While flowing along the portion 55 of the evacuated enclosure the fused high polymers are heated in a stepwise manner first up to 300°C, then to 400°C, and then to 500°C, the high polymers reaching the discharge port 66 at this time, where the needle valve 56 is arranged. Thus, the vertically extending section 14c shown in FIG. 4 surrounding the conduit portion 55 and forming the heating means 35 at this location is divided into three separate sections, in the form of separate jackets or the like, to provide the stepwise heating referred to above. These operations take place while the needle valve 56 is cyclically displaced between its open and closed position in synchronism with the rotary movement of the cam 59 in the manner described above. Thus, the fused high polymers will be received in the cylinder 57 when the port 66 is opened but remain in the evacuated enclosure portion 55 when the port 66 is closed. The evacuated space in the interior of the enclosure 30, 55, which become evacuated during the suction strokes of the piston 58 when the valve 56 is opened, becomes completely filled with the high polymers when the valve 56 is in its closed position shutting the port 66, and at this time any excess fluid which is received in the evacuated enclosure 30, 55 as a result of the action of the rotary feed screw 13 presses against the rod 52 so as to displace the latter to the left, as viewed in FIGS. 4 and 5, in opposition to the spring 54, so that in this way the volume of the evacuated enclosure 30, 55 can adapt itself to the particular amount of fluid which is received in this enclosure during the pressure strokes of the piston 58. Of course, the suction strokes of the piston 58 the valve 56 is raised to its open position, and simultaneously with the suction of the material from the enclosure 30, 55 into the cylinder 57 the spring 54 expands to return the rod 52 to its starting position shown in FIGS. 4 and 5.

During the suction strokes of the piston 58, the fused high polymers introduced into the reduced pressure interior of the cylinder 57 decompose rapidly into gaseous form. During this transformation from the liquid to the gaseous state, the molecular chains included in the high molecular hydrocarbons will be broken down to form a mixture of some lower molecular hydrocarbons. During the subsequent pressure stroke of the piston 58, the valve 56 closes so that the enclosure 30, 55 remains in its evacuated condition, and simultaneously the non-return valve 61 opens. The closing of the valve 56 is of course brought about automatically in a manner described above by the action of the cam 59. Therefore, at this time the mixture of gases resulting from decomposition in the cylinder 57 flows into the fluid-conveying means 18 which, as shown in FIG. 4, delivers the gases to the collecting means 40, in the form of a constant pressure sink and float tank, to be stored therein as described above in connection with FIG. 3. Since the condensed liquids and undecomposed residual liquids float on the water within the tank of the means 40, these products may be extracted from the tank by a separate means such as a suitable siphon unit, and the thus-extracted material may be used as a liquid fuel.

The gases which are stored in the collecting means 40 have a controlled pressure and temperature and discharge through the conduit 41. Part of these gases flow along the branch pipe 42, under control of the valve 43, into the combustion unit 44 which is situated at a convenient location. The remaining portion of gases flow through the branch 45, as controlled by the valve 46, to the gas burner 47 where perfect combustion of the gases is achieved by mixture of the gases with air from the blower 50. The heat extracted from the gases in this way at the burner 47 is directly used to drive the turbine 48 and the latter is used for generating power with the generator 49, as described above in connection with FIG. 3.

Thus, with the embodiment of FIGS. 4 and 5 the petrochemical high polymers are burned after they have been decomposed into gaseous form, by the application of heat at a reduced pressure. More specifically, prior to burning the gases they have been mixed uniformly with a sufficient volume of air. As a result there is no danger of that smoke and poisonous gases such as carbon monoxide, etc. will be generated due to imperfect combustion, which is often the case when solid bodies are burned. In addition it is an easy matter to control the combustion, because the materials which are burned are in a gaseous state immediately prior to combustion. Thus with the embodiment of FIGS. 4 and 5 the high polymers are decomposed into gases not only by heating and fusing them but also by reducing the operating pressure. This type of operation promotes to a large extent the decomposition of the high polymers and increases the efficiency of the decomposition while leaving a minimum amount of undecomposed residues.

Figure 6:
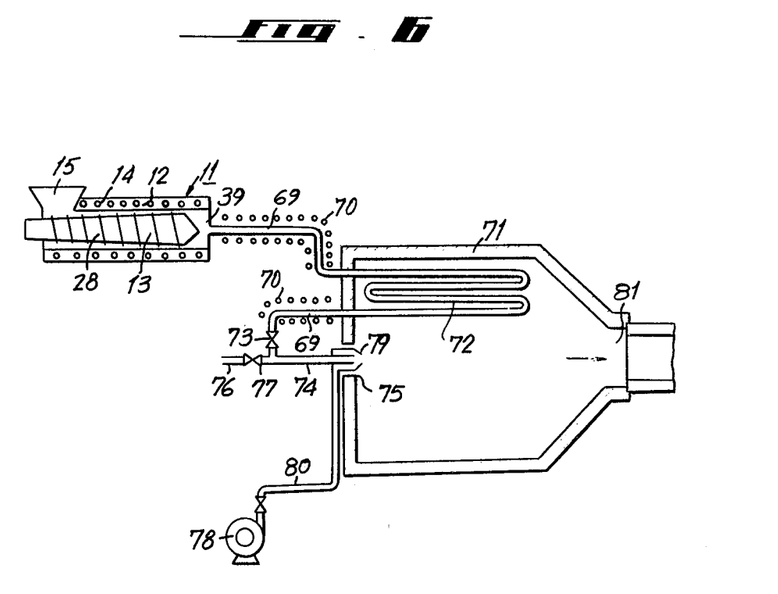
FIG. 6 is a schematic illustration of an embodiment of a method of the invention for converting the high polymers into a gaseous fuel which is burned.

Referring now to the fifth embodiment of the invention which is illustrated in FIG. 6, in this embodiment the combined compression and shearing means 11 is substantially identical with the means 11 of FIGS. 2–4. However, with this embodiment the decomposing means which receives the fused high polymers from the means 11 takes the form of an elongated heat-retaining pipe 69 provided with a heating means 70 in the form of a coil wound around the pipe 69 and provided in is interior with any suitable heating fluid which is circulated through the coil 70. The decomposing means includes in addition to the pipe 69 which receives the fused material directly from the means 11 an elongated extension 72 of the pipe 69, this extension 72 of the decomposed means of FIG. 6 being in the form of an elongated heating pipe situated within a combustion furnace 71. The fused material received in the heat-retaining pipe 69 traveling therethrough are heated within the pipe 72 in the furnace 71 and decomposed into the gaseous state. This pipe 72 is schematically illustrated in FIG. 6. It has a relatively long length and meanders back and forth in the upper region of the furnace 71 so as to have a length sufficiently great to bring about decomposition of the high polymers into the gaseous state. The decomposing means formed by the conduit 69 which has the portion 72 in the furnace 71 includes the outlet portion of the pipe 69 shown in FIG. 6 connected to the lower left end of the portion 72, this outlet portion extending to the exterior of the furnace and also being surrounded by a heating coil 70 which may form part of the coil 70 which surrounds the upper portion of the pipe 69 which is shown in FIG. 6 communicating with the means 11. This discharge portion of the decomposing means 69, 72 communicates through a valve 73 with a feed pipe 74 which communicates with the interior of the furnace 71 at the burner opening 75. A preheating pipe 76 communicates through the valve 77 with the feed pipe 74. Thus, from the pipe 76 it is possible to deliver a preheating gas to the pipe 74 to provide preliminary heating of the furnace. A primary air blower 78 is connected through a pipe 80 with the burner housing 79 which surrounds the discharge end of the feed pipe 74 and which has an opening directed toward the interior of the furnace. The furnace 71 is provided with a port 81 through which hot air discharges out of the furnace 71 to be used in any convenient manner.

With the embodiment of FIG. 6, when the operation of the furnace 71 is started, the valve 73 is closed and the valve 77 is opened so that the preheating gas is supplied from the fuel pipe 76 to the burner for preheating the combustion furnace 71. As a result the fused high polymers which flow into the portion 72 of the decomposing means will be heated and decomposed into gases. After this operation has taken place the valve 73 is opened simultaneously with the closing of the valve 77 so as to introduce to the feed pipe 74 the gases generated by decomposition of the high polymers, and it is these gases which are now delivered by the feed pipe 74 to the burner in order to be burned in the furnace 71. These gases are combined with air from the blower 78 and issue from the burner 79 into the combustion furnace 71 in which the burning takes place. The hot air which results from combustion in the furnace 71 is drawn out by a blower, for example, through the port 81 so as to serve as a heat source. Once combustion has been started the fused high polymers flowing through the decomposing pipe 72 will be continuously decomposed into gaseous form while utilizing for this purpose the heat resulting from combustion in the furnace 71 so that at this time there is no longer any requirement of preheating fuel, and the valve 77 remains closed with the supply of preheating fuel terminated.

Figure 7:
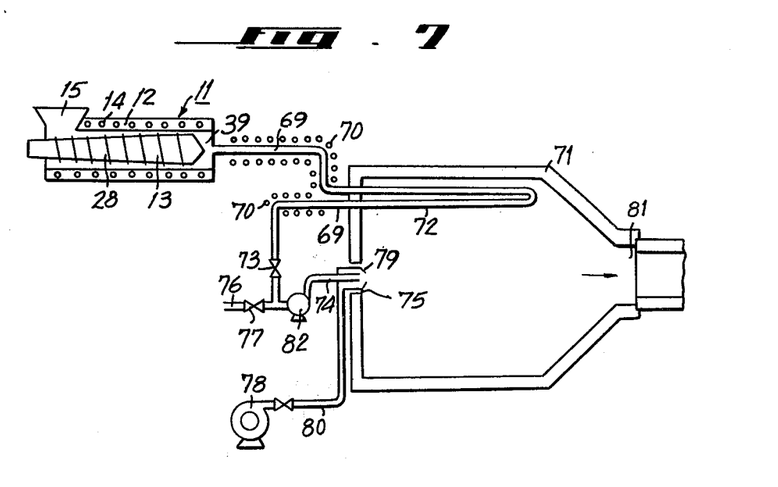
FIG. 7 is a schematic illustration of an embodiment of a method of the invention for converting high polymer wastes into a liquid fuel which is burned.

The embodiment of the invention which is illustrated in FIG. 7 differs from that of FIG. 6 only in that the portion 72 of the decomposing means 69, 72 is shorter than the portion 72 in FIG. 6. Thus the meandering tubular assembly within the furnace 71 of FIG. 7 has a shorter length than the meandering tubular assembly 72 of FIG. 6. As a result with this embodiment the fused high polymers will assume only a liquid state and will not be decomposed into the gaseous state. Therefore the decomposing means 69, 72 of FIG. 7 serves only to decompose the fused high polymers into a liquid state. It will be noted that with the embodiment of FIG. 7 there is a further distinction over FIG. 6 in that this embodiment includes a pump 82 for pumping the liquid high polymers from the decomposing means 69, 72 to the burner assembly. A preheating liquid fuel such as a heavy oil or the like is supplied for preheating purposes through the supply pipe 76 and the valve 77 to the pump 82 before combustion is started with the liquid fuel delivered from the decomposing means 69, 72.

By opening the valve 77 simultaneously with the closing of the valve 73, this preheating liquid fuel is pumped from the supply pipe 76 to the burner 79 by the pump 82. This preheating liquid fuel sprays from the burner 79 together with air from the primary blower 78, and combustion takes place within the furnace 71 of FIG. 7. In this embodiment since the heating pipe 72 is relatively short, the high polymers flowing into the heating pipe 72 will decompose only into the liquid state, and this liquid will flow toward the valve 73 in the form of a liqud fuel. After the preheating operations have been completed the valve 77 is closed and simultaneously the valve 73 is opened so that the pump 82 now pumps the high polymer liquid fuel to the burner to combine with the air from the blower 78 so as to maintain combustion in the furnace.

Assuming, for example, that the high polymer material flowing through the pupe 72 is polyethylene, then it will be dissociated into hydrogen, methane, ethane, ethylene, and other hydrocarbons at a temperature of about 500°C or more and liquefied. Therefore when initiating combustion, the high polymers flowing through the pipe 72 are required to be heated above the decomposition temperature by the combustion of the preheating fuel in the combustion furnace 71.

With the embodiments of FIGS. 6 and 7, the petrochemical high polymers are burned after they have been decomposed as a result of the heating into the gaseous form with the embodiment of FIG. 6 and the liquid form in the embodiment of FIG. 7. Specifically, when burning such gases or liquids, they are mixed uniformly with a sufficient volume of air so that there is no danger that smoke or other poisonous gases such as carbon monoxide, etc. are produced due to imperfect combustion, as is so often the case when solid bodies are directly burned. In addition it is an easy matter to control the combustion because the materials which are burned are in a gaseous or liquid form immediately prior to combustion. Furthermore once the system has been started, the high polymers are decomposed by way of the heat generated from the combustion of the high polymers themselves, so that there is no need to provide a separate heat source as long as the system continues to operate. In this way an exceeding efficiency is achieved with the embodiments of FIGS. 6 and 7.

Although the invention has been described by way of example with reference to specific embodiments shown in the accompanying drawings and described above, other modifications and variations may be apparent to those skilled in the art, without departing beyond the scope of the appended claims.

What is claimed is:

1. In a method of treating high polymer wastes without polluting the atmosphere, the steps of feeding solid petrochemical high polymer bodies which are decomposable by fusion along a predetermined path while simultaneously compressing and shearing the bodies until they reach a state of fusion and decompose at least in part into a fluid state and while tightly filling part of said path with said bodies in a manner preventing escape of gas rearwardly along said path past said part thereof, decompressing the thus-treated bodies immediately subsequent to the compression and shearing thereof while being fed along said path, for further enhancing decomposition, and directing the thus-achieved fluid to a location where it is available for further use.

2. In a method as recited in claim 1 and including the step of heating the high polymer wastes simultaneously with the compression and shearing thereof.

3. In a method as recited in claim 1 and wherein the fluid achieved from decomposition is directed to a location where it is stored so as to be available as a fuel.

4. In a method as recited in claim 1 and including for the decompressing step the step of directing the bodies immediately subsequent to compression and shearing thereof through an evacuated space having a low pressure which enhances decomposition.

5. In a method as recited in claim 4 and wherein the treated bodies are directed at intervals through said evacuated space by first opening the latter and drawing the treated bodies into said space and then closing the latter space and pushing the treated bodies out of said space.

* * * * *

UNITED STATES PATENT OFFICE
CERTIFICATE OF CORRECTION

Patent No. 3,947,256     Dated March 30, 1976

Inventor(s) Yoichi Tsukagoshi et al.     Page 1 of 6

It is certified that error appears in the above-identified patent and that said Letters Patent are hereby corrected as shown below:

In the grant (only) insert the drawings as shown on the attached sheets.

Signed and Sealed this

Thirteenth Day of July 1976

[SEAL]

Attest:

RUTH C. MASON
*Attesting Officer*

C. MARSHALL DANN
*Commissioner of Patents and Trademarks*